US010839512B2

(12) United States Patent
Luengo Hendriks

(10) Patent No.: US 10,839,512 B2
(45) Date of Patent: Nov. 17, 2020

(54) METHOD OF DOT DETECTION WITHIN IMAGES OF TISSUE SAMPLES

(71) Applicant: Flagship Biosciences, Inc., Westminster, CO (US)

(72) Inventor: Cris L. Luengo Hendriks, Broomfield, CO (US)

(73) Assignee: Flagship Biosciences, Inc., Westminster, CO (US)

( * ) Notice: Subject to any disclaimer, the term of this patent is extended or adjusted under 35 U.S.C. 154(b) by 0 days.

(21) Appl. No.: 16/171,654

(22) Filed: Oct. 26, 2018

(65) Prior Publication Data
US 2020/0134814 A1    Apr. 30, 2020

(51) Int. Cl.
*G06T 7/00*    (2017.01)

(52) U.S. Cl.
CPC .. *G06T 7/0012* (2013.01); *G06T 2207/30024* (2013.01)

(58) Field of Classification Search
None
See application file for complete search history.

(56) References Cited

U.S. PATENT DOCUMENTS

| | | | | |
|---|---|---|---|---|
| 2010/0104148 | A1* | 4/2010 | Bovik | G06K 9/4633 382/128 |
| 2015/0078648 | A1* | 3/2015 | Lee | G06K 9/0014 382/133 |
| 2018/0204048 | A1* | 7/2018 | Chefd'hotel | G06K 9/0014 |
| 2018/0253590 | A1* | 9/2018 | Lloyd | G06T 7/0012 |
| 2019/0046232 | A1* | 2/2019 | Tokuda | A61B 34/20 |

OTHER PUBLICATIONS

I. Smal, M. Loog, W. Niessen, E. Meijering, "Quantitative comparison of spot detection methods in fluorescence microscopy", IEEE Transactions on Medical Imaging 201029:282-301, 2010.
P. Ruusuvuori, T. Äijö, S. Chowdhury, C. Garmendia-Torres, J. Selinummi, M. Birbaumer, A.M. Dudley, L. Pelkmans, O. Yli-Harja, "Evaluation of methods for detection of fluorescence labeled subcellular objects in microscope images", BMC Bioinformatics 11:248-264, 2010.

(Continued)

*Primary Examiner* — Wen W Huang
(74) *Attorney, Agent, or Firm* — Josiah Barbour

(57) ABSTRACT

We present a method to detect dots in microscope images of tissue samples for the purpose of diagnosis or therapy selection. Dots in tissue arise trough CISH or FISH staining, but also through staining of small cellular compartments, or in other ways. The method is applicable to both brightfield and fluorescence modalities, as well as mass spectrometry imaging methodologies. The method is based on the use of first and second derivatives of the image along the image axes, computed using regularized derivative operators, i.e. Gaussian derivatives. The outputs of these operators are examined at appropriate distances from each location in the image. The found values must have specific signs. If the signs are all correct, these values are multiplied together to obtain a confidence measure for a dot being present at that location. If the signs do not match, no dot is present, and a zero is output.

9 Claims, 6 Drawing Sheets

(56) References Cited

OTHER PUBLICATIONS

K. Štěpka, P. Matula, P. Matula, S. Wörz, K. Rohr, M. Kozubek, "Performance and Sensitivity Evaluation of 3D Spot Detection Methods in Confocal Microscopy", Cytometry Part A 87A:759-772, 2015.
A. Allalou, A. Pinidiyaarachchi, and C. Wåhlby, "Robust Signal Detection in 3D Fluorescence Microscopy", Cytometry Part A 77A:86-96, 2010.
J. Dupač, and V. Hlaváč, "Stable wave detector of blobs in Images", in: Proceedings of 28th Annual Symposium of the German Association for Pattern Recognition, LNCS 4174:760-769, 2006.

* cited by examiner

METHOD OF DOT DETECTION WITHIN IMAGES OF TISSUE SAMPLES

BACKGROUND

Field of the Invention

The present invention relates generally to image analysis methods for the assessment of tissue samples. More specifically, the present invention relates to image analysis methods for the evaluation of dot-based dyes applied to tissue samples, such as chromogenic in-situ hybridization (CISH) and fluorescent in-situ hybridization (FISH).

Description of the Related Art

Traditionally, dots are detected using a Laplace of Gaussian (LoG) operator (the sum of convolutions with the second derivatives along each image axis of a Gaussian kernel), a Difference of Gaussian (DoG) operator (which is very similar to the LoG), or a top-hat filter. All three find dots by comparing to a "model" dot, however all three will have a strong response to lines as well as dots, and the LoG and DoG also present a response to edges. Hence, appropriate pre-processing and post-processing is usually necessary. Many methods have been described in the literature, most of which boil down to combining appropriate noise filtering, applying one of the three detectors above, and finally fine-tuning the result by combining nearby detections and discerning meaningful from meaningless detections. Consequently, these methods require many parameters to tune.

One of the more effective algorithms with few parameters to tune uses a cosine-shaped filter kernel as detector, and a sine-shaped filter kernel as a verifier. These filters are derived from frequency analysis (they are the basis functions of the Fourier transform). A dot in an image produces a strong negative response from the cosine filter, but so do other image features. To separate the dot's response from the others, the response of the sine filter is examined. For a dot, the sine filter is expected to have a strong positive response on one side, and a strong negative response on the other side. Thus, if at pixel $(x, y)$ the cosine filter has a response $C(x, y) < -T$ (for some threshold T), and the sine filter has a response at four neighboring pixels of $S(x-1, y) < 0$, $S(x, y-1) < 0$, $S(x+1, y) > 0$ and $S(x, y+1) > 0$, then a dot has been found. Thus, the method has two parameters: one for the size of the filters, and one for the threshold.

The cosine along each dimension is applied as a single convolution, producing a single result, whereas the sine along each dimension is applied as a separate one-dimensional convolution, yielding a separate result for each dimension.

These one-dimensional sinusoid kernels cover many fewer pixels than full multi-dimensional kernels, and therefore are less capable of averaging over the noise. We note that the two one-dimensional cosine kernels are combined and applied as a single convolution, but the combined kernel still covers only a small amount of pixels compared to a full multi-dimensional kernel.

SUMMARY

In accordance with the embodiments herein, a method for detecting dots within a stained tissue sample is disclosed. The method described herein utilizes digital image analysis of an image of one or more stained tissue sections to detect the presence or absence, and the location, of at least one dot within the tissue section by calculating an intensity value for each pixel in the digital image, then calculating a second order derivative value for each pixel using a Gaussian gradient operator, inverting the second order derivative value of each pixel, setting all negative inverted second order derivative values to zero (0), calculating a first order derivative value for each pixel in the digital image along the first axis of the digital image using a Gaussian gradient operator, and for each pixel n with a non-zero inverted second order derivative value: multiplying the inverted second order derivative value by −1 and the first order derivative value of pixels n+k and n−k, for a chosen k, if the first order derivative value of pixel n+k is negative and n−k is positive, setting all other pixel values to zero (0), identifying each non-zero pixel as a detected dot, and determining a patient status for the patient associated with the tissue sample based on the detected dot(s).

DETAILED DESCRIPTION OF EMBODIMENTS

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions without departing from the spirit and scope of the invention.

For purpose of definition, a tissue object is one or more of a cell (e.g., immune cell), cell sub-compartment (e.g., nucleus, cytoplasm, membrane, organelle), cell neighborhood, tissue compartment (e.g., tumor, tumor microenvironment (TME), stroma, lymphoid follicle, healthy tissue), blood vessel, and lymphatic vessel. Tissue objects are visualized by histologic stains which highlight the presence and localization of the tissue object. Tissue objects can be identified directly by stains specifically applied to highlight that tissue object (e.g., hematoxylin to visualize nuclei, IHC stain for a protein specifically found in a muscle fiber membrane), indirectly by stains applied which non-specifically highlight the tissue compartment (e.g., DAB staining), or are biomarkers known to be localized to a specific tissue compartment (e.g., nuclear-expressed protein, carbohydrates only found in the cell membrane).

For the purpose of definition, patient status includes diagnosis of disease state, disease severity, disease progression, and therapy efficacy. Other patient statuses are contemplated.

For the purpose of definition, a dot is any sufficiently small amount of localized staining, typically no more than a few pixels across. A dot can arise for example from staining a protein that occurs in isolation or is concentrated to very small cellular compartments, from a stain that is specific to a unique DNA sequence, or in other ways. The method presented here could equally well be applied to dots in other imaging modalities, or applications other than tissue slides; for example stars, paint sputtered on a surface to visualize its movement, or single fluorescent molecules in single-molecule super-resolution imaging (PALM/STORM).

Figure 1A:
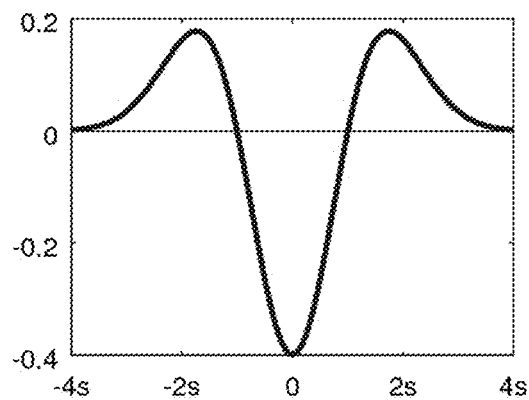
FIGS. 1a-b show the similarities between cosine and sine filters to the second and first order Gaussian derivatives respectively.
Figure 1A:
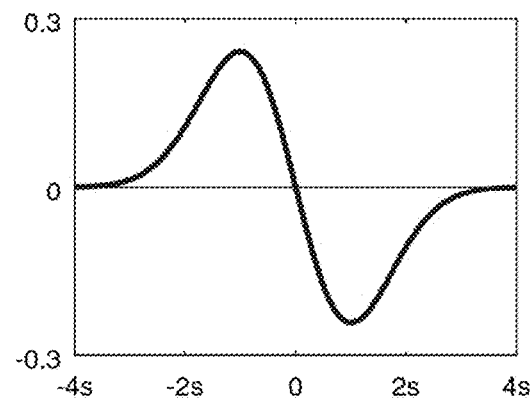
Figure 1B:
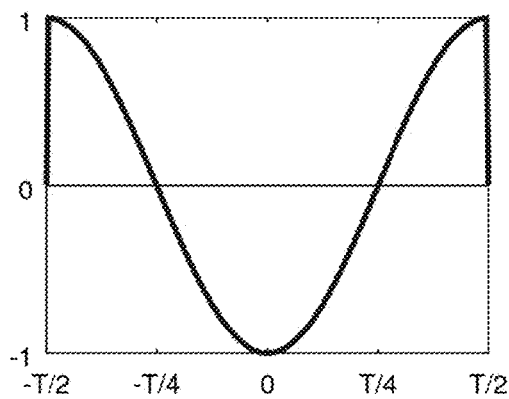
Figure 1B:
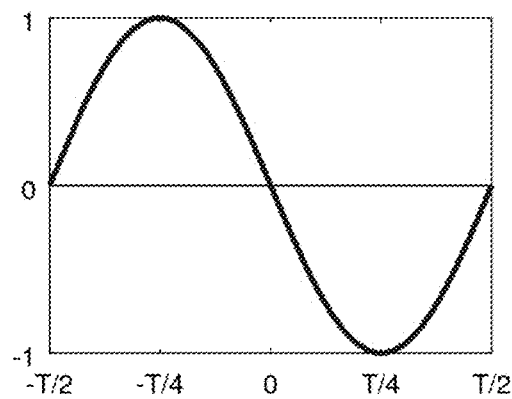

Here we improve on the older methods by noting that the cosine filter is similar to the second derivative of a Gaussian kernel, and the sine filter is similar to the first derivative of a Gaussian kernel, as can be seen by comparing FIG. 1a to FIG. 1b. We also note that the detector can thus be interpreted as finding locations in the image where the second derivative is negative (which happens on local maxima), and the derivatives on either side have different sign (which also happens on local maxima).

It is well known that the Gaussian kernel provides an optimal balance between compactness in the spatial domain and the frequency domain, and that it is the only convolution kernel that is separable yet perfectly isotropic. It is thus an optimal smoothing filter (or regularization filter). The derivatives of the Gaussian kernel are therefore very good regularized estimators of the derivatives of the image. A convolution with the derivative of the Gaussian is identical to the derivative of the image convolved with a Gaussian regularization kernel:

$$f(x, y) * \frac{d}{dx}G(x, y) = \frac{d}{dx}[f(x, y) * G(x, y)]$$

and the same is true for higher-order derivatives. These derivative kernels are also separable. That a kernel is separable means that it can be applied to the image with relatively small computational cost.

Figure 2:
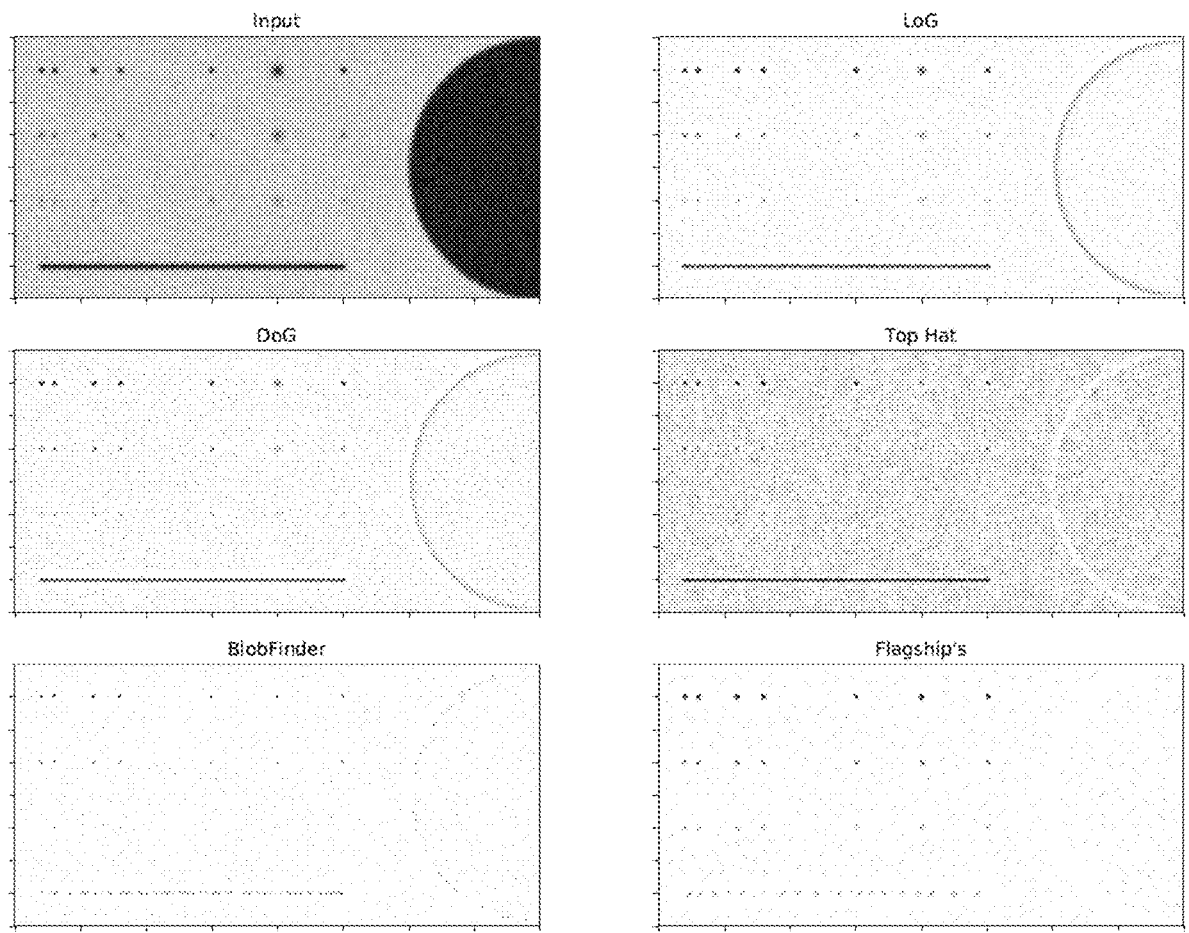
FIG. 2 shows an example of different dot detection methods compared in a noisy environment, including the invention presented herein.
Figure 3:
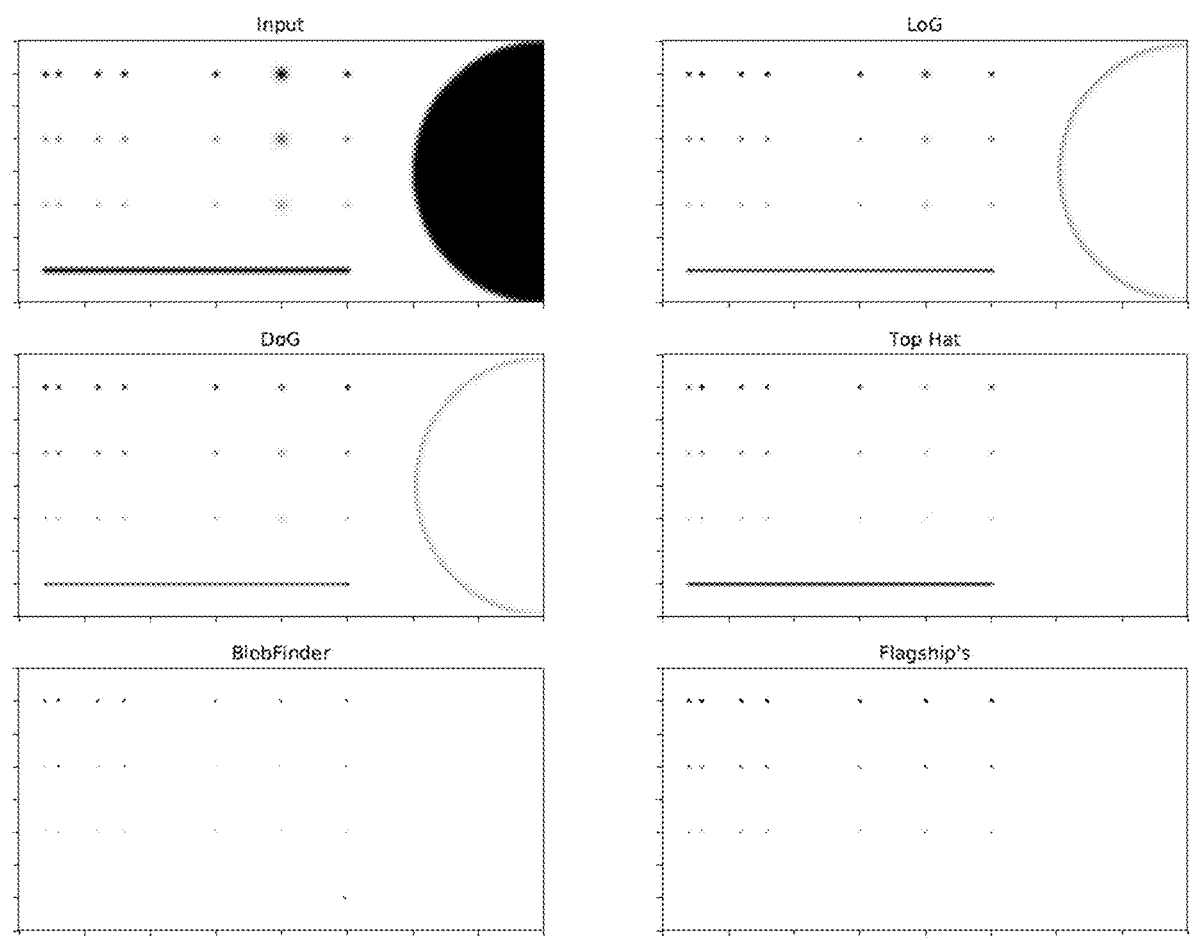
FIG. 3 shows an example of different dot detection methods compared in a non-noisy environment, including the invention presented herein.
Figure 4:
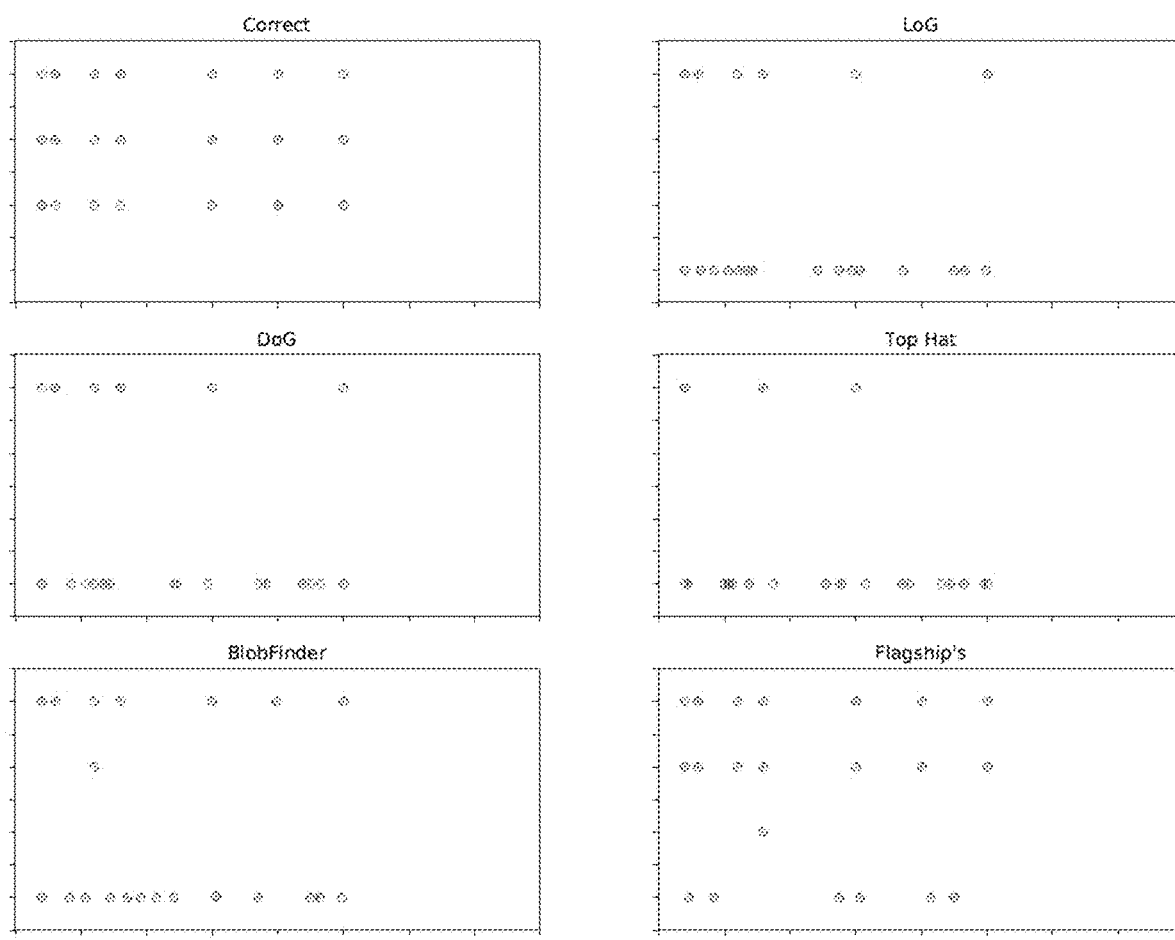
FIG. 4 shows the largest local maxima of the results of different dot detection methods in a noisy environment shown in FIG. 2, including the invention presented herein.
Figure 5:
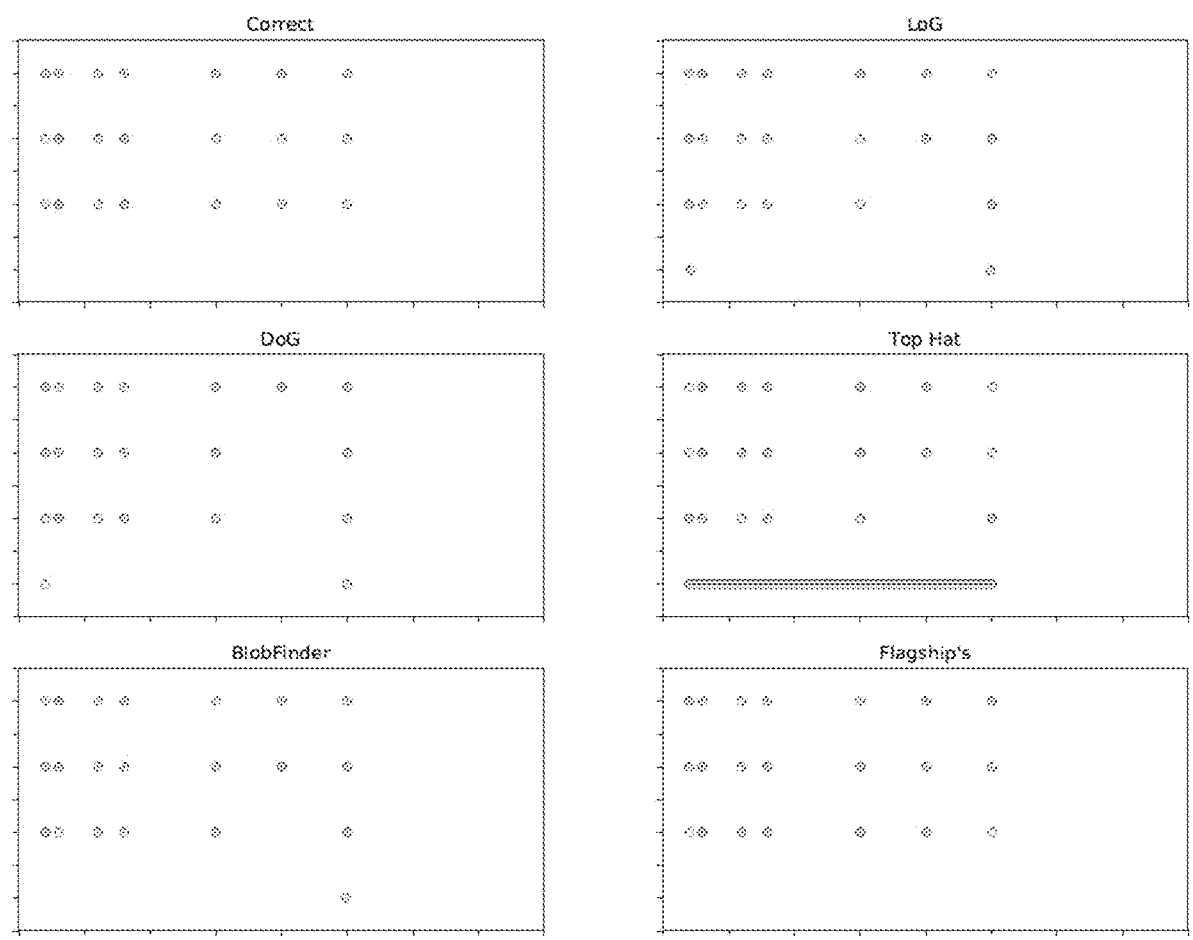
FIG. 5 shows the largest local maxima of the results of different dot detection methods in the non-noisy environment shown in FIG. 3, including the invention presented herein.

FIG. 2 and FIG. 3 show the present invention compared to methods well known in the art. As can be seen in those figures, the present invention shows a marked increase in the ability of a computer system to identify dots within both noisy and non-noisy environments compared to the currently well-known methods. Looking at the maxima detected within the noisy and non-noisy environments, as shown in FIG. 4 and FIG. 5, it is again readily apparent that the present invention provides a significant improvement on the methods well known in the art.

Figure 6:
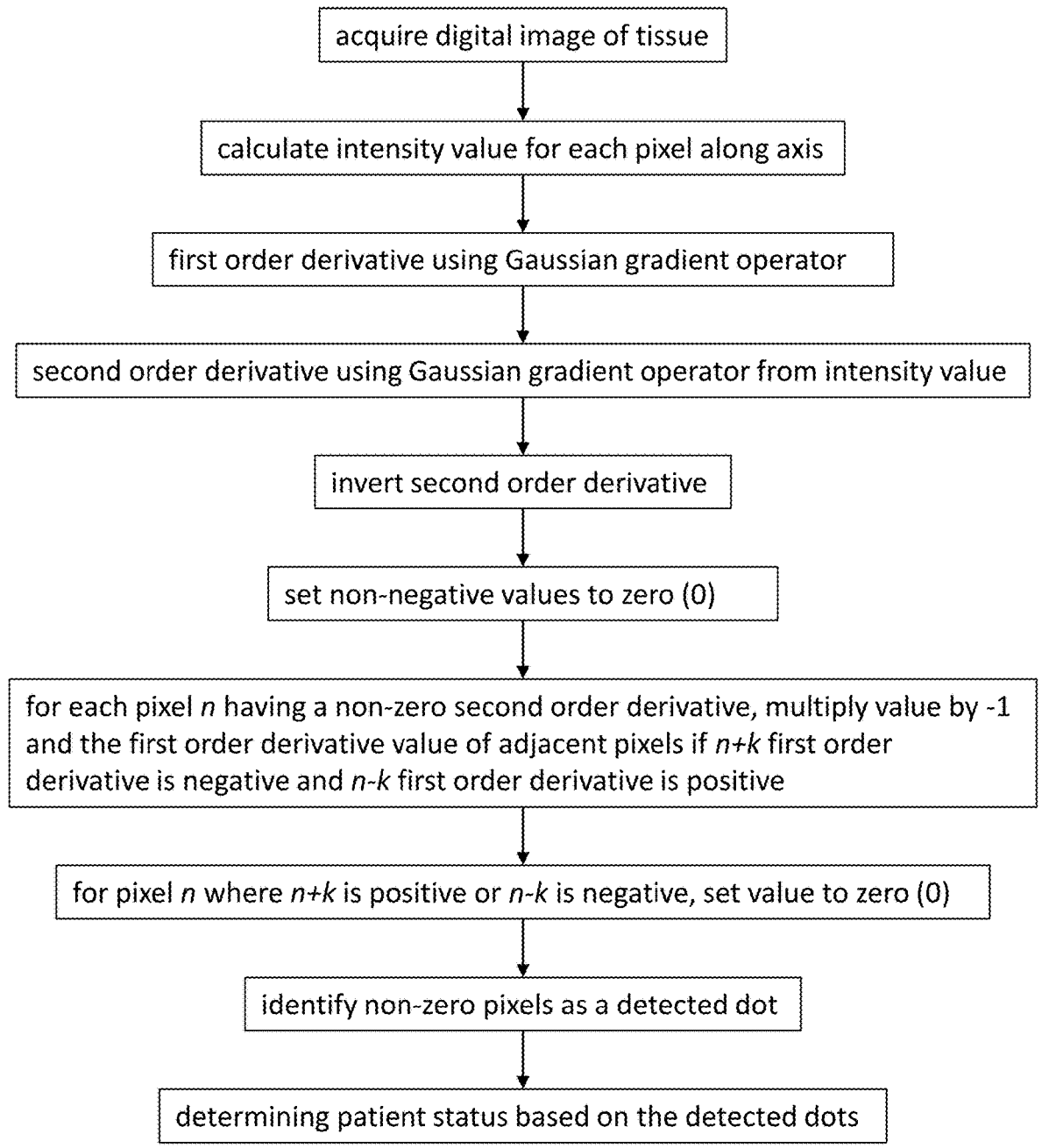
FIG. 6 provides an overview of the general method of the invention.

In one embodiment, as summarized in FIG. 6, the method may be used in the diagnostic setting to diagnose disease or direct therapy, or in the prognostic setting to predict patient outcome in relation to an expected course of disease. The method may be comprised of six steps; i) calculating an intensity value for each pixel along a single axis in the digital image, then calculating a second order derivative value for each pixel using a Gaussian gradient operator, ii) inverting the second order derivative value of each pixel, setting all negative inverted second order derivative values to zero (0), iii) calculating a first order derivative value for each pixel in the digital image along the first axis of the digital image using a Gaussian gradient operator, and for each pixel n with a non-zero inverted second order derivative value: iv) multiplying the inverted second order derivative value by −1 and the first order derivative value of pixels n+k and n−k, for a chosen k, if the first order derivative value of pixel n+k is negative and n−k is positive, v) setting all other pixel values to zero (0), and vi) identifying each non-zero pixel as a detected dot. This embodiment can also be used in a patient selection setting, where a test is used to predict response to a specific therapeutic intervention.

In other embodiments, additional steps can be added to the previously disclosed method to allow for the method to be used in multiple dimensions. In this embodiment, the above steps i-v would be repeated along a second (or third, fourth, or however many) axis within the digital image. Prior to determining a patient status, the pixel values determined along each axis would be multiplied together to create a new value for each pixel summarizing the value for each axis within the analyzed image. Typically, the axes would be perpendicular to each other, but this is not required.

In further embodiments, the pixel values could be normalized against each other to discount for variations in staining intensity, image quality, and other contemplated image variations. In this embodiment, the pixel values are multiplied by the product of expected peak values and then the $3n^t$ root is taken of the multiplied value, where n is the number of axes analyzed within the digital image. For example, in an image with 2 axes analyzed, the multiplied value would have the $6^{th}$ root taken.

The k used above would ideally be set to a distance $k=\sqrt{\sigma_k^2+\sigma_d^2}$, where $\sigma_k$ is the parameter of the Gaussian kernel used to compute the derivatives (this parameter determines the amount of regularization applied), and $\sigma_d$ is the parameter of the best fit Gaussian for the dots to be detected (i.e. it selects the scale at which to detect dots). This k is the distance at which the Gaussian derivative is maximal in magnitude. However, other values of k will work well also, and the method is very robust against changes in the parameter k.

In further embodiments, a threshold can be applied to the dot values in order to eliminate potential dots that have very low dot values. The eliminated dots would then be excluded from any determinations of patient status or other post-detection analysis of the tissue samples. The threshold applied could be a fixed threshold across a wide cohort of samples or a variable threshold for each individual sample within a cohort.

What is claimed is:
1. A method comprising:
  acquiring at least one digital image of at least one stained tissue section;
  detecting at least one dot within the at least one digital image; and
  determining at least one patient status using the at least one detected dot;
  wherein the detecting at least one dot comprises the steps of:
    calculating an intensity value for each pixel in the digital image along a first axis;
    calculating a second order derivative value for each pixel in the digital image along the first axis of the digital image using a Gaussian gradient operator;
    inverting the second order derivative value of each pixel to create an inverted second order derivative value for each pixel;
    setting all negative inverted second order derivative values to zero (0);
    calculating a first order derivative value for each pixel in the digital image along the first axis of the digital image using a Gaussian gradient operator; and
    for each pixel n with a non-zero inverted second order derivative value:

multiplying the inverted second order derivative value by −1 and the first order derivative value of pixels n+k and n−k to create a dot value, for a chosen value of k, if the first order derivative value of pixel n+k is negative and n−k is positive;
setting the dot value to zero (0) if the first order derivative value of pixel n+k is positive; and
setting the dot value to zero (0) if the first order derivative value of pixel n−k is negative; and
identifying each non-zero dot value as a detected dot.

2. The method of claim 1, further comprising normalizing the dot values.

3. The method of claim 2, wherein the normalizing is performed by multiplying the dot values by a product of expected peak values and taking the cube root of the total.

4. The method of claim 1, wherein the detecting at least one dot further comprises calculating dot values along at least one additional axis.

5. The method of claim 4, further comprising multiplying the dot values along the first axis by the dot values along each additional axis to create a summary dot value for each pixel within the digital image.

6. The method of claim 5, further comprising normalizing the summary dot value by multiplying the summary dot value by a product of expected peak values and taking the $3n^{th}$ root of the total, where n is the number of individual axes.

7. The method of claim 1, wherein patient status is selected from the group consisting of diagnosis of disease state, disease severity, disease progression, and therapy efficacy.

8. The method of claim 1, further comprising applying a threshold to the dot value wherein the dot values below the threshold are ignored.

9. A method comprising:
acquiring at least one digital image of at least one stained tissue section;
detecting at least one dot within the at least one digital image; and
determining at least one patient status using the at least one detected dot;
wherein patient status is selected from the group consisting of diagnosis of disease state, disease severity, disease progression, and therapy efficacy; and
wherein the detecting at least one dot comprises the steps of:
calculating an intensity value for each pixel in the digital image;
calculating an x-axis second order derivative value for each pixel in the digital image along an x axis of the digital image using a Gaussian gradient operator;
inverting the x-axis second order derivative value of each pixel to create an x-axis inverted second order derivative value for each pixel along the x axis;
setting all negative x-axis inverted second order derivative values to zero (0);
calculating an x-axis first order derivative value for each pixel in the digital image along the x axis of the digital image using a Gaussian gradient operator;
calculating a y-axis second order derivative value for each pixel in the digital image along a y axis of the digital image using a Gaussian gradient operator;
inverting the y-axis second order derivative value of each pixel to create a y-axis inverted second order derivative value for each pixel along the y axis;
setting all negative y-axis inverted second order derivative values to zero (0);
calculating a first order derivative value for each pixel in the digital image along the y axis of the digital image using a Gaussian gradient operator;
for each pixel n with a non-zero first axis inverted second order derivative value:
multiplying the x-axis inverted second order derivative value by −1 and the x-axis first order derivative value of pixels n+k and n−k along the x axis to create an x-axis dot value, for a chosen value of k, if the x-axis first order derivative value of pixel n+k is negative and n−k is positive;
setting the x-axis dot value to zero (0) if the x-axis first order derivative value of pixel n+k is positive; and
setting the x-axis dot value to zero (0) if the x-axis first order derivative value of pixel n−k is negative;
for each pixel m with a non-zero y-axis inverted second order derivative value:
multiplying the y-axis inverted second order derivative value by −1 and the y-axis first order derivative value of pixels n+k and n−k along the y axis to create a y-axis dot value, for a chosen value of k, if the y-axis first order derivative value of pixel n+k is negative and n−k is positive;
setting the y-axis dot value to zero (0) if the y-axis first order derivative value of pixel n+k is positive; and
setting the y-axis dot value to zero (0) if the y-axis first order derivative value of pixel n−k is negative;
multiplying together each pixel's x-axis dot value by that pixel's y-axis dot value to create a summary dot value;
normalizing the summary dot value by multiplying the summary dot value by a product of expected peak values and taking the $6^{th}$ root of the total;
applying a threshold to the summary dot values; and
identifying each summary dot value above the threshold as a detected dot.

* * * * *